United States Patent [19]

Duncan et al.

[11] Patent Number: 4,961,199
[45] Date of Patent: Oct. 2, 1990

[54] METHODS FOR REDUCING THE LOSS OF METAL IN A METAL VAPOR LASER

[75] Inventors: David B. Duncan, Auburn; Terry W. Alger, Tracy, both of Calif.

[73] Assignee: The United States of America as represented by the United States Department of Energy, Washington, D.C.

[21] Appl. No.: 409,990

[22] Filed: Sep. 19, 1989

Related U.S. Application Data

[63] Continuation of Ser. No. 210,180, Jun. 20, 1988, abandoned, which is a continuation of Ser. No. 911,942, Sep. 26, 1986, abandoned.

[51] Int. Cl.⁵ ............................................. H01S 3/22
[52] U.S. Cl. ....................................... 372/56; 372/61
[58] Field of Search .................................. 372/56, 61

[56] References Cited

U.S. PATENT DOCUMENTS

| | | | |
|---|---|---|---|
| 3,654,567 | 4/1972 | Hodgson | 372/56 |
| 3,798,486 | 3/1974 | Hernquist | 372/56 |
| 3,863,178 | 1/1975 | Ferrar | 372/56 |
| 4,247,830 | 1/1981 | Karras et al. | 372/56 |

Primary Examiner—William L. Sikes
Assistant Examiner—Georgia Y. Epps
Attorney, Agent, or Firm—Miguel A. Valdes; Roger S. Gaither; William R. Moser

[57] ABSTRACT

Methods are provided for reducing loss of metal from a metal vapor laser by collecting metal present outside the hot zone of the laser and introducing or confining it in the hot zone.

2 Claims, 1 Drawing Sheet

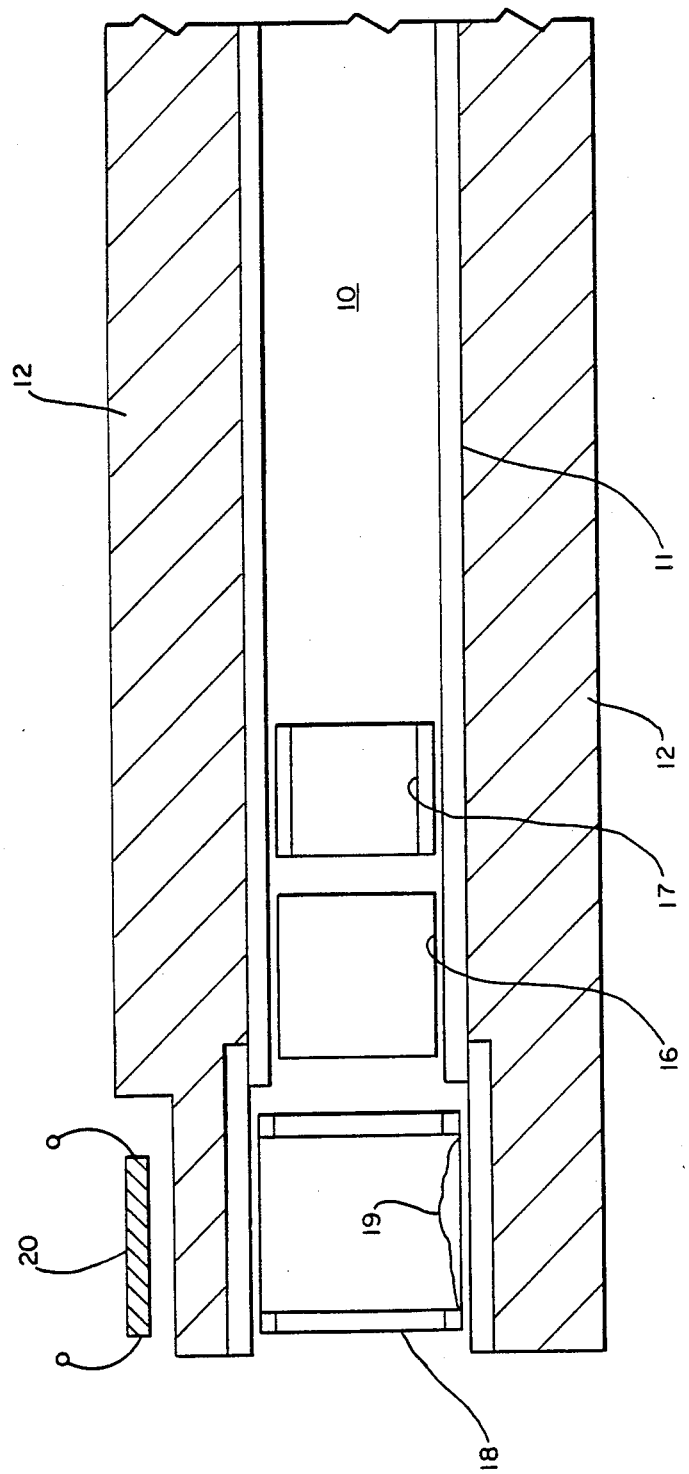

METHODS FOR REDUCING THE LOSS OF METAL IN A METAL VAPOR LASER

The United States government has rights in this invention pursuant to Contract No. W-7405-ENG-48 between the United States Department of Energy and the University of California for the operation of Lawrence Livermore National Laboratory.

This is a continuation of Ser. No. 911,942, Sept. 26, 1986, now abandoned, which is a continuation of application Ser. No. 210,180, filed June 20, 1988, now abandoned.

FIELD OF THE INVENTION

The present invention is directed to methods for reducing the loss of metal from a metal vapor laser during operation of the laser.

BACKGROUND OF THE INVENTION

The copper vapor laser (CVL) is one of a number of electric-discharged-excited metal-vapor lasers that are characterized by laser-transitions from an excited state to a low-lying metastable state. One of the problems which limits the continuous operational lifetime of a CVL is the gradual loss of copper which decreases the output and efficiency of the laser. This is an increasingly important problem which severely limits the economical adaptation of lasers to a laser installation of industrial scale. Copper loss increases the frequency of down time required to replenish the primary copper load within the laser.

SUMMARY OF THE INVENTION

It is an object of the present invention to provide methods for reducing the loss of metal during the operation of a metal vapor laser.

It is the further object of the invention to provide modifications of a metal vapor laser which adapt the laser for collection of metal outside of the hot zone within the bore of the laser and reintroduction thereof into the hot zone.

Briefly, the present invention provides methods for reducing the loss of metal from a metal vapor laser comprising a main bore which contains the metal and circumferentially accommodates the laser beam, comprising the steps of collecting metal present outside of or near the outer boundaries of the volume within the bore of the laser wherein the temperature is greater than the melting point of the metal (the hot zone), and by various means set forth herein, introducing or confining this collected metal into the hot zone.

Additional objects, advantages and novel features of the present invention will be set forth in part in the following description, and in part will become apparent from those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawing, which is incorporated in and forms a part of the specification, illustrates preferred embodiments of the invention and, together with the description, serves to explain the principles of the invention.

The FIGURE is a longitudinal, cross-sectional view of a generally tubular laser structure for generating laser pulses where the structure includes a plurality of means for reducing the loss of metal from the main bore of the laser.

DETAILED DESCRIPTION OF THE PREFERRED EMBODIMENTS

Reference will be made in detail to the preferred embodiments of the invention, examples of which are collectively illustrated in the accompanying drawing. While the invention will be described in connection with the preferred embodiments, it will be understood that the invention is not limited thereto. Therefore, the following description is provided in connection with the preferred embodiment as applied to a copper vapor laser (CVL), but it will be understood that the invention is applicable to any metal vapor laser. The invention is intended to cover all alternatives, modifications and equivalents as may be included within the spirit and scope of the invention as defined herein and by the appended claims.

In a CVL, the electric discharge excitation of the copper vapor which produces the laser beam is generally performed within a discharge tube, termed the main bore of the laser. Within this main bore there is generally a so-called hot zone, which is the volume within the main bore of the laser where the temperatures are such that there is an appropriate copper vapor pressure. Copper vapor is primarily lost by diffusion toward the two ends of the main bore where the temperatures become cool enough to cause condensation of liquid copper, and even in some areas to form solid copper. Once liquified or solidified, the copper is unavailable for lasing, and over time, the power and efficiency of the CVL declines to a point at which the CVL must be shut down in order to replenish the copper supply in the hot zone. The present invention provides methods for reducing the loss of copper vapor from the hot zone of the laser by collecting condensed copper outside of the hot zone and reintroducing it into the hot zone and/or by replenishing the copper within the hot zone by particular design of the laser apparatus.

Referring to the FIGURE, there is shown a longitudinal cross-section of approximately one-half of a cylindrical copper vapor laser wherein the center of the main bore of the laser is approximately in the region 10. The hot zone is also approximately in region 10. The laser typically comprises a cylindrical main bore 11 surrounded by insulation 12. In one embodiment, one or more wicks are provided within the main bore to provide condensing surfaces for the copper vapor. Instead of exiting the main bore through the ends of the laser, the copper vapor is condensed on a surface wettable by liquid copper and then transported to the hot zone by a wicking action for revaporization. At least two types of wicks may be utilized, the first being one where a low steady state load of liquid vapor is condensed on a smooth surfaced wick 16. Another type of sponge wick 17 may also be used alone or in combination with the smooth-surface wick 16 which is adapted to accommodate a massive load of condensed copper. The circumferential thickness of a massive load sponge wick 17 may be provided, for example, with a corrugated or mesh surface to enhance surface area on which the copper vapor may condense.

In yet another embodiment of the present invention, one or both ends of the main bore of the laser may be equipped with a defroster wherein a trap 18, preferably larger than the diameter of the main bore, is provided to collect the condensed and/or solidified copper 19. The trap 18 and/or the environment of the trap may then be heated, for example, externally by a heater 20 to a temperature sufficient to liquefy or vaporize the copper thereby allowing return to the hot zone by flow from gravity and surface tension.

It will be understood that the above embodiments may be used singly or in combination to maintain the desired level copper vapor with the CVL.

The foregoing description of the preferred embodiments of the invention is provided for purposes of illustration and description. It is not intended to be exhaustive or to limit the invention to the precise forms disclosed and obviously many modifications and variations are possible in light of the above teachings. The embodiments were chosen and described in order to best explain the principles of the invention and their practical application to thereby enable others skilled in the art to best utilize the invention and the various embodiments and with various modifications as are suited to the particular use contemplated and it is intended that the scope of the invention is defined by the claims appended hereto.

What is claimed is:

1. In a lasing device in which a metal vapor is lased, said device comprising a main bore defining the interior of said bore, said interior comprising a hot zone in which the temperature is sufficient to maintain at least the predetermined vapor pressure of said metal required for lasing, the improvement comprising at least one trap for collecting condensed metal unavailable for lasing during continuous operation of said lasing device, said trap located outside of said hot zone and within said interior, and heating means external to said bore for providing heat to said trap to revaporize said condensed metal to thereby replenish said metal vapor.

2. A laser-beam generating device according to claim 1 wherein said metal comprises copper.

* * * * *